United States Patent [19]

Krude et al.

[11] Patent Number: 4,747,806

[45] Date of Patent: May 31, 1988

[54] DETACHABLE FLANGE CONNECTION FOR TORQUE TRANSMITTING DRIVE SHAFT PARTICULARLY FOR CONNECTING TWO PARTS OF A CARDAN DRIVE SHAFT FOR MOTOR VEHICLES

[75] Inventors: Werner Krude; Werner Hoffmann, both of Siegburg, Fed. Rep. of Germany

[73] Assignee: Uni-Cardan Aktiengesellschaft, Siegburg, Fed. Rep. of Germany

[21] Appl. No.: 86,213

[22] Filed: Aug. 13, 1987

Related U.S. Application Data

[63] Continuation of Ser. No. 816,382, Jan. 6, 1986, abandoned.

[30] Foreign Application Priority Data

Jan. 31, 1985 [DE] Fed. Rep. of Germany ....... 3503194

[51] Int. Cl.$^4$ .......................... F16D 1/02; B60K 17/22
[52] U.S. Cl. .................................... 464/182; 403/337; 464/181
[58] Field of Search ................ 138/109, 130; 285/238, 285/334.5, 405, 412; 403/335, 336, 337, 338; 464/162, 178, 181, 182, 183

[56] References Cited

U.S. PATENT DOCUMENTS

| 979,985 | 12/1910 | Moorhead | 464/183 X |
|---|---|---|---|
| 3,030,253 | 4/1962 | St. John et al. | 285/238 X |
| 3,399,908 | 9/1968 | Kurtz | 285/334.5 X |
| 3,661,670 | 5/1972 | Pierpont, Jr. | 138/109 X |
| 3,746,374 | 7/1973 | Sedgwick et al. | 285/238 X |
| 4,173,128 | 11/1979 | Corvelli | 464/183 X |
| 4,362,521 | 12/1982 | Puck et al. | 464/182 X |
| 4,380,443 | 4/1983 | Federmann et al. | 464/181 |
| 4,530,379 | 7/1985 | Policelli | 464/182 X |
| 4,551,116 | 11/1985 | Krude | 464/181 X |

FOREIGN PATENT DOCUMENTS

| 2728306 | 1/1978 | Fed. Rep. of Germany . | |
| 2821677 | 11/1979 | Fed. Rep. of Germany | 464/181 |
| 547040 | 8/1956 | Italy | 403/337 |
| 918242 | 2/1963 | United Kingdom | 403/337 |
| 1330313 | 10/1970 | United Kingdom . | |

*Primary Examiner*—Daniel P. Stodola
*Attorney, Agent, or Firm*—Toren, McGeady & Associates

[57] ABSTRACT

A joint between a pair of longitudinal members, one of which is formed of fiber-reinforced plastic having fibers wound at a fiber angle α taken relative to a longitudinal angle of the member, and the other of which is made of metal, e.g., steel. The plastic member is formed with an integral flange extending at a flange angle β and the other member is formed with a flange having a frustoconical surface in abutment with the flange of the plastic member. The relationship $\beta \leq \alpha$ is maintained to ensure that the flange on the plastic member is wound on a geodetic plane thereby becoming nonslip.

5 Claims, 2 Drawing Sheets

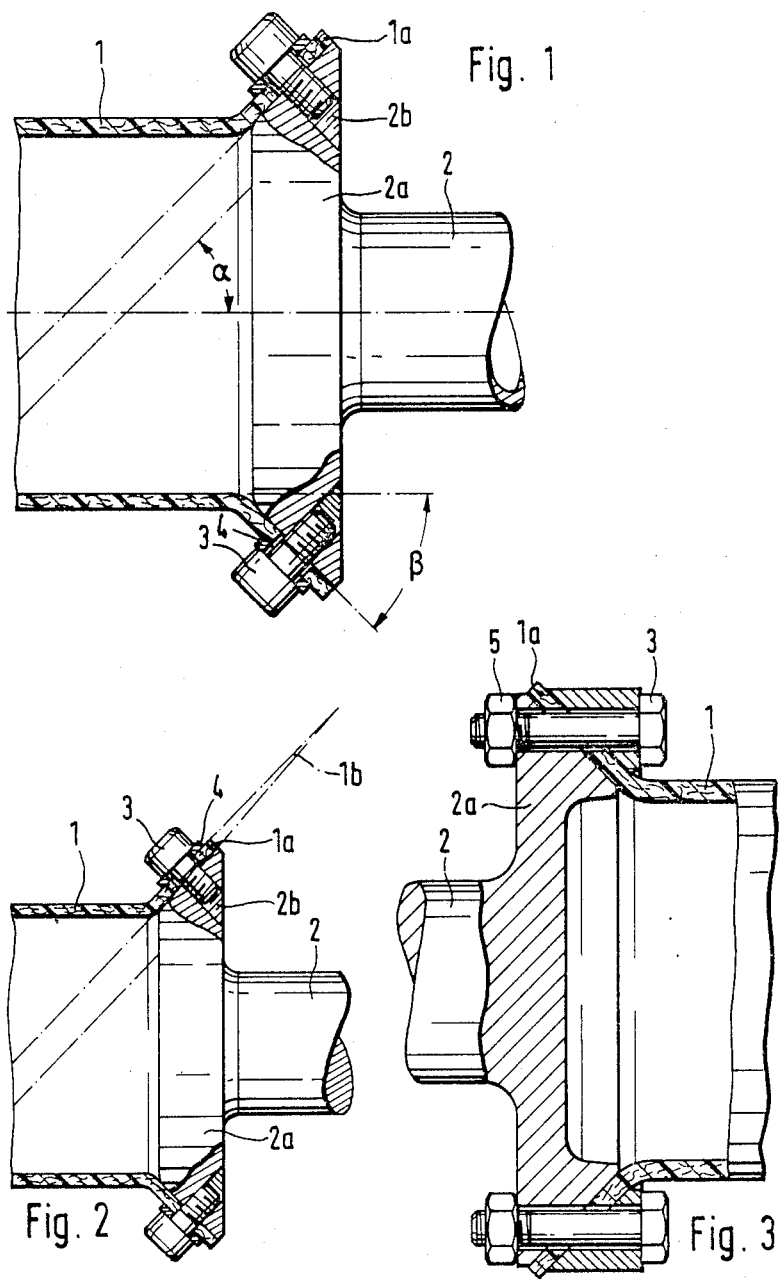

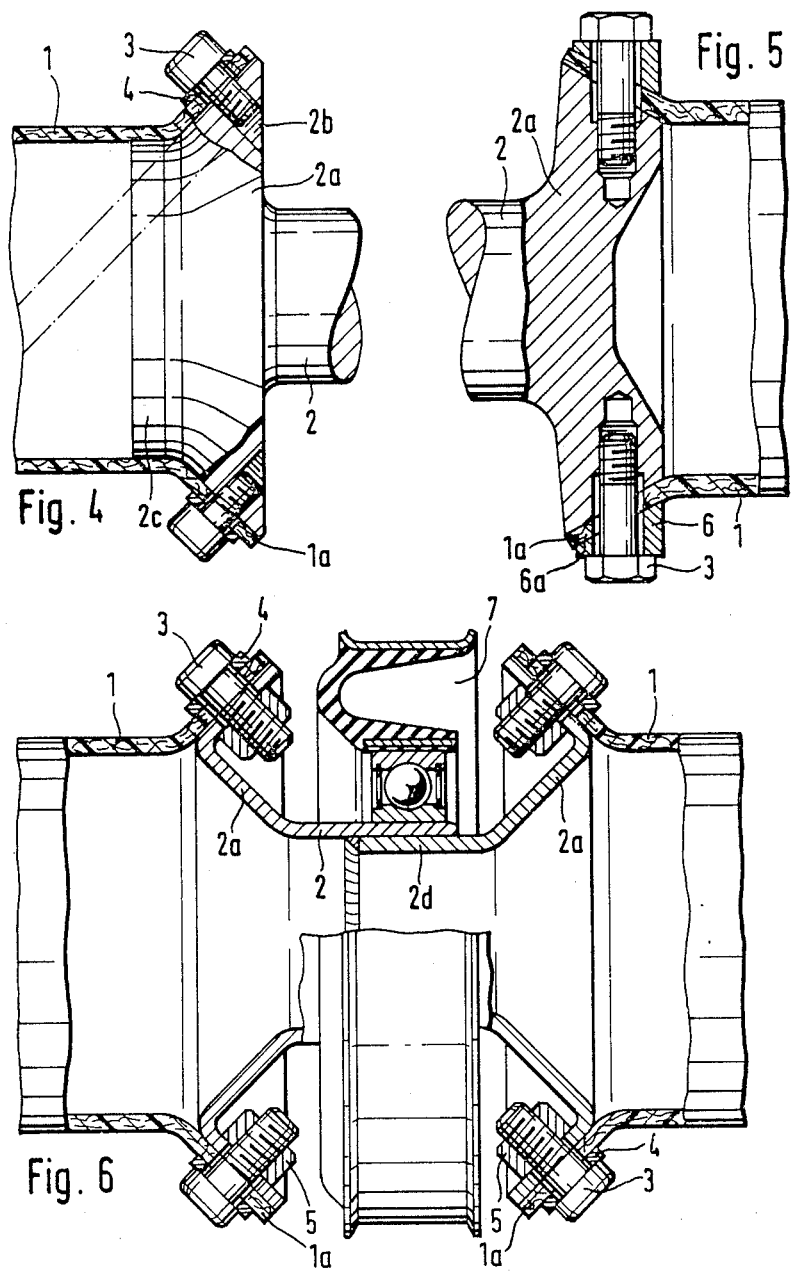

DETACHABLE FLANGE CONNECTION FOR TORQUE TRANSMITTING DRIVE SHAFT PARTICULARLY FOR CONNECTING TWO PARTS OF A CARDAN DRIVE SHAFT FOR MOTOR VEHICLES

This is a continuation of application Ser. No. 816,382, filed Jan. 6, 1986 now abandoned.

The present invention relates generally to connection assemblies and more particularly to an unfastenable connection or joint between two shafts or tubular members of different materials wherein, for instance, one may be made of glass or carbon fiber-reinforced plastics and the other of steel. The joint of the invention is of the type which may be effected by tensioning elements, flanges, bolts or the like.

To save weight, dampen vibrations and reduce noise and also to save fuel, it is necessary in automotive engineering to ensure that the connecting shafts used for transmitting the engine power through a differential onto the rear wheels be, as far as possible, lightweight, low-noise, low-vibration elements.

The drive shafts commonly used for this purpose are of solid steel or they are steel tubes. Provided that they are dimensioned accordingly, such shafts are perfectly capable of transmitting torque from the engine to the rear wheels, but their dead weight is relatively high and, under certain operating conditions, they frequently act as vibration resonators and noise generators.

To eliminate these and similar inadequacies, it is known to produce and use one-piece drive shafts made of fiber-reinforced plastics. Although such shafts are lighter than steel shafts and have the effect of reducing vibration and noise, they have their natural limits in transmitting high torques.

It is, therefore, an object of the present invention to provide a simple and unfastenable connection between a fiber-reinforced plastics shaft and a steel shaft which ensures the introduction and transmission even of high torques. Depending on design and space-specific conditions, the steel shaft may be either of solid steel or of tube material.

SUMMARY OF THE INVENTION

Briefly, the present invention may be described as a connection assembly or joint between a pair of longitudinal members, one formed of fiber-reinforced plastics and the other of steel. Each member has at an end thereof where it is joined to the other member an integral flange, and the invention is particularly characterized in that:

the flange integral with the tube consisting of fiber-reinforced plastic is arranged at an angle $\beta$ of a defined size relative to the longitudinal axis of the tube-shaped member;

between the flange angle $\beta$ and the winding angle $\alpha$ of the fibers, there exists the relation $\beta \leq \alpha$ which ensures that the flange is wound on a geodetic plane, thereby becoming nonslip; and the counter-member consisting of steel or the like and effecting the introduction of force, such as a tube, for example, has been provided with a flange which is integral with the tube and has a centering cone whose angle of inclination corresponds to the angle $\beta$ of the flange formed onto the tube consisting of fiber-reinforced plastics.

In an advantageous embodiment of the invention, especially with respect to winding of the flange, the flange of the fiber-reinforced plastics tube is tapered radially outwardly.

In a further embodiment of the invention, the flange of the counter-member, e.g., the steel tube, at its end facing the fiber-reinforced plastics tube, has been provided with a cylindrical projection which serves to center the two members.

Particular importance is attached to the use of the connection in accordance with the invention for a drive shaft of motor vehicles, together with a supporting bearing. The invention specifies that in a fixed space or in a space which is variable in the axial direction of the shaft connection, at the end facing away from the fiber-reinforced plastic flanges, provision be made for a supporting bearing of a known type.

In a further embodiment of the invention, a space of constant size is produced by a permanent connection, i.e., by welding, pressing or the like, between the members forming one unit with the steel flanges.

As an alternative, according to a further embodiment of the invention, the space of variable size is produced by an unfastenable connection which essentially consists of telescopically movable members which carry longitudinal teeth corresponding to each other and at their ends facing away from the supporting bearing are provided with steel flanges.

The present invention has a number of advantages, the most important one being that the connection fully meets the requirements of motor vehicle drive technology in that, on the one hand, it is capable of transmitting even high torques and, on the other hand, excessive vibration and/or noise are avoided. A further advantage consists in that it is easy to unfasten or separate. This feature is important, especially as regards any maintenance and repair work and easy replacement. Furthermore, the fact that the flanges correspond to each other ensures that they center each other automatically so that any out-of-balance is avoided from the start. And further, by taking account of the flange angle $\beta$ in its relation to the winding angle $\alpha$, an easy, rapid and uncomplicated winding of the fiber-reinforced plastics connecting part including its integral flange is ensured. This, in turn, means optimum utilization of the properties inherent in the fiber-reinforced plastics.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DESCRIPTION OF THE DRAWINGS

In the drawings:

FIG. 1 is a sectional view showing the connection of a tubular, fiber-reinforced plastics shaft to a correspondingly designed counter-member, e.g., a steel shaft, depicting the inclination angle of the flange and the winding angle;

FIG. 2 is a sectional view illustrating a connection according to FIG. 1 with a symbolic illustration of the radially outwardly tapered flange of the tube shaft consisting of fiber-reinforced plastic;

FIG. 3 is a sectional view showing a connection according to FIG. 1, but with the fixing bolts arranged parallel to the longitudinal axis of the tube;

FIG. 4 is a sectional view illustrating a connection according to FIG. 1, but having a centering projection engaging into the tubular shaft consisting of fiber-reinforced plastic and arranged at the flange of the counter-member such as a steel shaft for example;

FIG. 5 is a sectional view showing a connection according to FIG. 1, but having fixing bolts arranged perpendicularly relative to the longitudinal axis of the tube; and FIG. 6 is a sectional view showing the use of two connections similar to FIG. 1 in a drive shaft of motor vehicles, together with a supporting bearing.

DETAILED DESCRIPTION OF THE PREFERRED EMBODIMENTS

Referring now to the drawings and more particularly to FIG. 1, there is shown a joint composed of a tubular shaft 1 consisting of fiber-reinforced plastic and having a flange 1a whose inclination relative to the longitudinal axis of the tubular shaft 1 is characterized by the angle $\beta$. The shaft 1 consists of fibers which are wound at a fiber angle $\alpha$ relative to the axis of the shaft 1. Between the angle $\beta$ and the fiber winding angle $\alpha$, there exists a relation $\beta \leq \alpha$ in order to ensure that the flange 1a is wound on a geodetic plane and in consequence becomes nonslip. That is, with $\beta$ at least approximately equal to $\alpha$, the fibers of the tubular shaft 1 are wound on shortest possible geodetic lines, thereby avoiding slippage between ratation of the flange 1a and rotation of the rest of shaft 1, when torque is to be transmitted.

The assembly also includes a counter-member 2, and the tubular shaft 1 and the flange 1a form one piece just like the counter-member 2, which may be a tubular shaft 2 consisting of steel or the like and having a flange 2a.

The inclination corresponding to the angle $\beta$ of the flange 1 or the cone produced by it has a self-centering effect relative to the flange 1a. The connection between the two flanges 1a, 2a is effected in a way known in itself by a number of circumferentially distributed bolts 3 and washers 4. The bolts 3 in the present example arranged rectangularly relative to the flange inclination angle $\beta$ are fixed in threads 2b of of the flange 2a arranged in the same way.

The connection shown in FIG. 2 is similar to that of FIG. 1, including the reference numerals. However, in addition to FIG. 1, FIG. 2 shows that the flange 1a —illustrated by a chain-dotted line and having the reference numeral 1b —is tapered radially outwardly, which facilitates winding.

The design of the embodiment shown in FIG. 3 also corresponds to that of FIG. 1. However, the connection between the two flanges 1a, 2a is effected by a number of circumferentially distributed bolts 3 and nuts 5 whose axes extend parallel to the longitudinal axis of the members 1, 2, such as tubular shafts, for example.

Deviating from the embodiment of FIG. 1, FIG. 4 shows the flange 2a of the member 2—in this case, in the form of a tubular shaft—having a cylindrical projection 2c further serving to center the two members 1, 2. If necessary, the outer circumference of this projection may be provided with a knurl or the like in order to achieve an even closer connection between the two members 1, 2.

The design of FIG. 5 also corresponds to that of FIG. 1 However, in FIG. 5, the circumferentially distributed connecting bolts 3 are screwed perpendicularly relative to the longitudinal axis of the members 1, 2 into the flange 2a. To effect an adjustment to the inclination of the flange 1a of the tubular shaft 1 in order to be able to screw in the bolts 3 perpendicularly relative to the longitudinal axis of the tubular shaft 1, provision has been made for a possibly divided ring 6 whose annular face facing the flange 1a has the same inclination angle $\beta$ as the flange itself.

In accordance with the above-described design, the embodiment of FIG. 6 consists of two connections arranged in a mirror image way. The member 2d provided with a corresponding fit and having a smaller diameter is inserted into the member 1 having a greater diameter so that both parts may be connected permanently by welding, pressing or the like, for example.

The jacket of the member 2 simultaneously serves to receive a supporting bearing 7 known in itself. Instead of providing a permanent connection between the members 1, 2c as shown in FIG. 4, it is also possible to provide an unfastenable connection which would take the form of telescopically movable longitudinal teeth (not shown).

On the basis of the present invention, it is, of course, also possible to provide different connections in the form of nut and bolt connections. For example, the two halves of the connection may be joined by a common union ring, nut or the like. This results in a further advantage in that, especially the fiber-reinforced flange will not be subject to any mechanical damage.

Thus, it will be seen that, in accordance with the present invention, there is provided a tube connection of different materials, such as fiber-reinforced plastics, on the one hand, and steel or the like on the other hand, with the flange being integral with the fiber-reinforced plastic member and being formed on at an angle $\beta$. The relation between the angle $\beta$ and the winding angle $\alpha$ is $\beta \leq \alpha$.

In order to achieve centering with the fiber-reinforced member and its flange, the flange of the corresponding countermember, such as a steel tube, has been provided with a conical face. As a rule, the two members are connected in a conventional way by bolts and possibly nuts.

The invention also specifies practical examples for such a tube connection, with the telescopically inserted members, such as steel tubes, simultaneously serving to accommodate a supporting bearing known in itself. The telescopically inserted members may either be connected permanently or they may have longitudinal teeth permitting axial movability of the connection.

While specific embodiments of the invention have been shown and described in detail to illustrate the application of the inventive principles, it will be understood that the invention may be embodied otherwise without departing from such principles.

What is claimed is:

1. A detachable flange connection assembly for joining together at their ends a pair of longitudinal members made of different materials for transmission of torque, comprising:

a first longitudinal tubular member made of fiber-reinforced plastic and consisting essentially of fibers wound at a fiber angle $\alpha$ taken relative to a longitudinal axis of said first member;

a first flange at an end of said first member formed integrally therewith shaped as a uniformly outwardly tapering frustum extending at a flange angle $\beta$ relative to said longitudinal axis;

said flange angle $\beta$ and said fiber angle $\alpha$ being at least approximately equal to each other to ensure that fibers of the tubular member are wound on shortest possible geodetic lines, thereby becoming nonslip;

a second member made of metal having a second flange thereon formed integrally therewith, said second flange being formed with a frustoconical surface having an angle of inclination which corresponds to said flange angle $\beta$ and being in abutment with said first flange; and connecting means extending through said first and second flanges detachably and nondestructively joining said first and second members together.

2. A connection assembly according to claim 1, wherein said second flange at an end facing said first member is provided with a cylindrical projection which serves to center said first and second members.

3. A connection assembly according to claim 1, wherein said connecting means comprises a plurality of bolts being fastened through said first flange and to said second flange, said bolts extending perpendicularly to said longitudinal axis.

4. A connection assembly according to claim 1, wherein said connecting means comprises a plurality of bolts extending through said first and second flanges and extending parallel to said longitudinal axis.

5. A connection assembly according to claim 1, wherein said connecting means comprises a plurality of bolts extending through said first flange and being fastened to said second flange, said plurality of bolts extending perpendicularly to said flange angle $\beta$.

* * * * *